Oct. 11, 1949.  E. J. ROBERTS  2,484,647
ION EXCHANGE TREATMENT OF SOLUTIONS
Filed Aug. 24, 1945  2 Sheets-Sheet 1
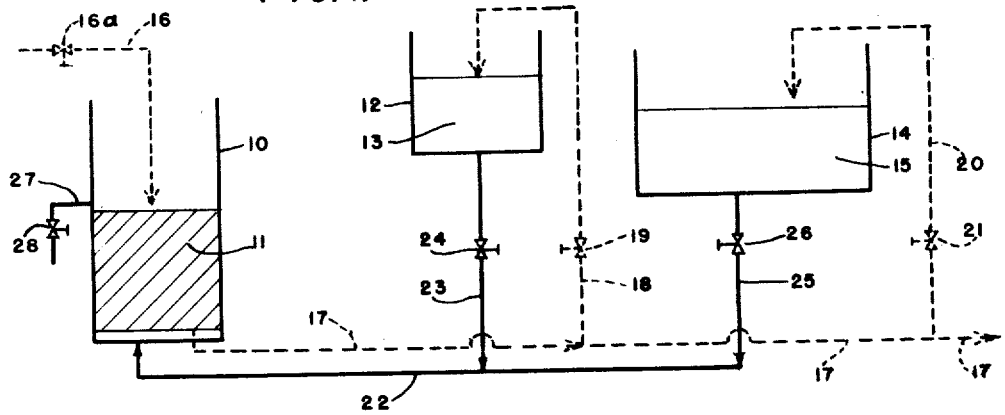
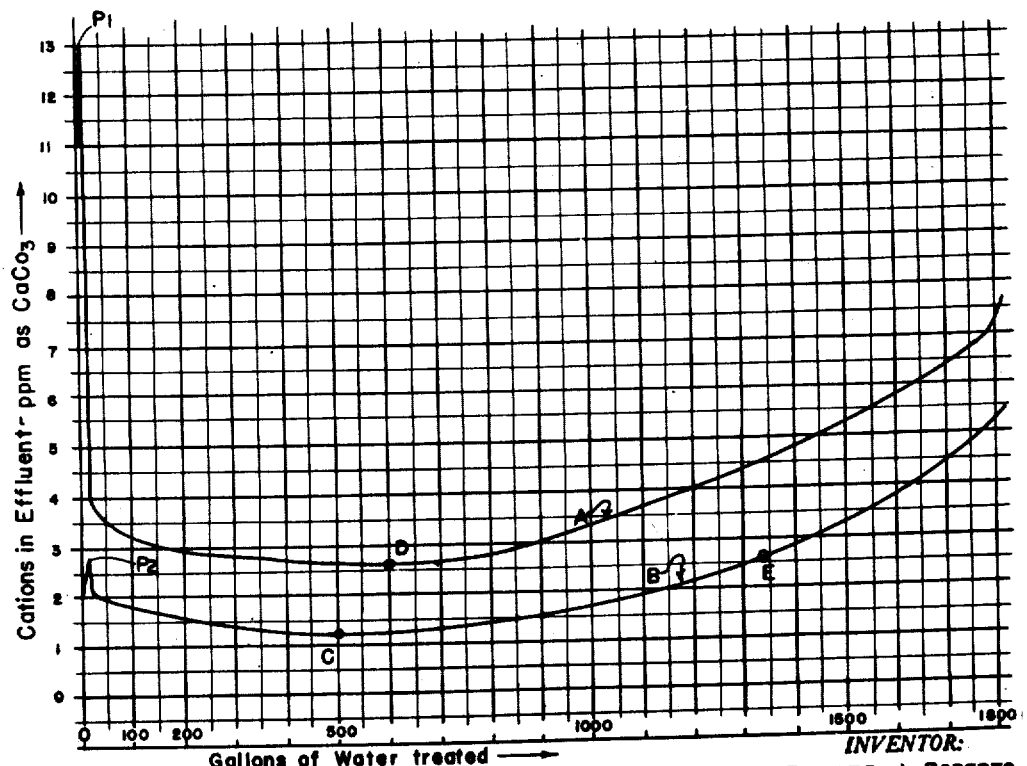
INVENTOR:
ELLIOTT J. ROBERTS,
ATTORNEY FIG. 3.
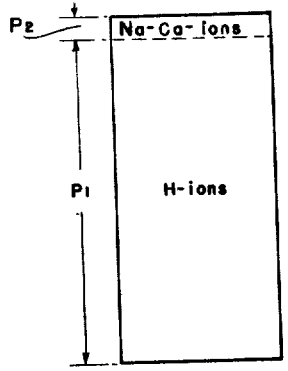
(a)
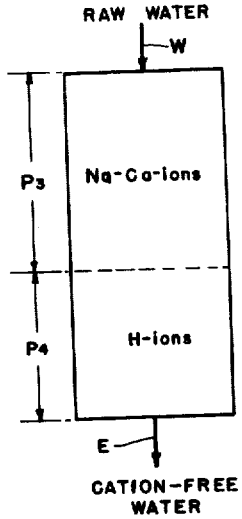
(b)
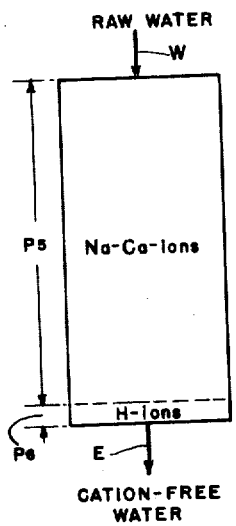
(c)
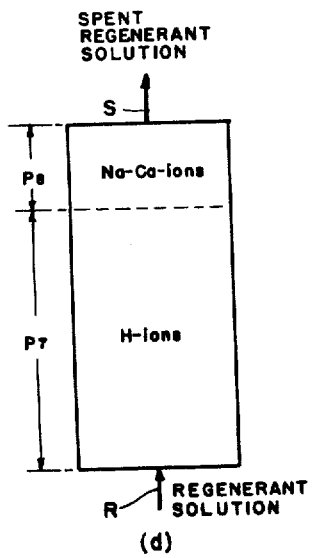
(d)
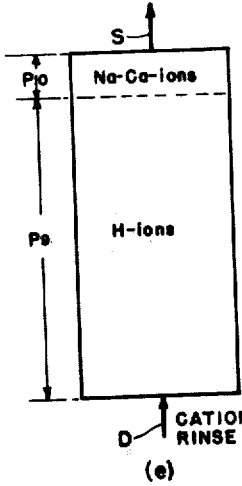
(e)
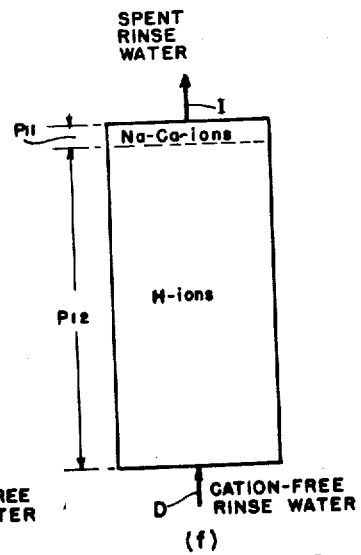
(f)
INVENTOR:
ELLIOTT J. ROBERTS,
BY Arthur Middleton
ATTORNEY Patented Oct. 11, 1949

2,484,647

UNITED STATES PATENT OFFICE 2,484,647

ION EXCHANGE TREATMENT OF SOLUTIONS

Elliott J. Roberts, Westport, Conn., assignor to The Dorr Company, New York, N. Y., a corporation of Delaware Application August 24, 1945, Serial No. 612,465

5 Claims. (Cl. 210—24)

This invention relates to ion exchange treatment of solutions, in which the ion exchange operating cycle comprises exhausting the exchange capacity of a bed of granular exchange material by passing therethrough the solution to be treated, restoring the exchange capacity of the bed by passing therethrough a regenerant solution, and washing the bed free of regenerant solution with rinse water.

Problems in such ion exchange treatments revolve around the effectiveness, the efficiency, and the economy of the operation. In this connection the degree of effectiveness is the degree or extent to which certain ions can be removed from the solution by this operation, efficiency denotes the ratio between the exchange capacity of the material and its requirement in regenerant chemical for a given ion removal, while economy is concerned with the consumption of regenerant chemical in relation to a maximum removal of ions from the solution to be treated, as well as with the consumption of water (rinse water) needed for maintaining the operating cycle at high effectiveness and efficiency.

It is among the objects of this invention to provide a method of operation in the way of ion exchange treatment of solutions which is efficient in the sense that the ratio between the exchange capacity of the material and its regenerant consumption is relatively high, and which is economical as to its requirement in regenerant chemicals for a maximum ion removal.

Another object is to attain an optimum utilization of the exchange capacity of a given volume of exchange material.

More in particular, although in no limiting sense, this invention relates to the de-ionization of water, that is the treatment for effecting removal of dissolved and ionized salts from the water. The principle of such de-ionization of water is well known in the art, and comprises subjecting the raw water sequentially to cation and anion exchange treament by means of wellknown cation and anion exchanger materials purchasable on the open market, and whereby the dissolved salts are abstracted from the water and replaced with the molar equivalent of pure water.

That is to say, the salt-containing water to be treated and herein called the raw water, when passing through a properly regenerated bed of granular cation exchange material gives up its cations to that material while in turn receiving from the material the molar equivalent in H-ions whereby the water becomes correspondingly acidified. Thereupon the acidified water is passed through a bed of granular anion exchange material causing it to give up the anions of the acid to the material and to receive in exchange OH-ons (hydroxyl ions) from the material. Thus the molar equivalent of HOH, that is pure water, has been substituted for the dissolved salts. The anion exchange material is also termed an acid removing material since the net result of its function is the removal of the acid from a solution or water.

The exhaustion of an ion exchange bed while the solution is passing downwardly therethrough, proceeds in continuous downward fashion through the bed. That is to say a dividing line or rather zone of transition exists between an upper exhausted portion of the bed and the complementary lower yet unexhausted portion of the bed. In other words, this dividing line or zone between the exhausted and the unexhausted portion of the bed keeps shifting downwardly through the bed as the exhausting solution flowing therethrough leaves an increasing exhausted portion behind while passing through a correspondingly decreasing portion of unexhausted or active exchange material. Since the dividing line is not a sharp one there will be noticed a lessening of the degree of exchange as the exhaustion approaches the bottom of the bed. In the de-ionization treatment of a raw water the final stages of exhaustion are indicated by a rising of the pH of the effluent water. Eventually a more or less sudden rise in pH is observed indicating that the bed requires regeneration since the so-called "breakthrough" has been reached. The subsequent regeneration of the bed takes place progressively in a manner similar, although chemically in reverse, to the process of exhaustion.

When the respective exchange materials have had their exchange capacity exhausted by the continued flow therethrough of the solution being treated, they must be regenerated. The cation exchange material requires an acid, while the anion exchange material requires an alkali solution for regeneration. For example, wellknown exchange materials are organic materials of the class of synthetic resins sometimes also briefly called exchange resins. A resinous cation exchange material operating in the hydrogen cycle is regenerable with a strong mineral acid such as $H_2SO_4$, while a resinous anion acidadsorbing anion exchange material is regenerable with an alkali such as $Na_2CO_3$.

Therefore, in a more specific sense, it is among the objects of this invention to de-ionize water so effectively that for practical purposes it may substitute for distilled water. Additional objects are to conduct such effective de-ionization with a minimum requirement in regenerant chemicals, in rinse water, at optimum utilization of the exchange capacity of the exchange material, and in such a manner that the degree of de-ionization of the water treated continues high, that is without substantial fluctuations in the final bed effluent.

This invention may be exemplified by its application to the cation or the anion exchange treatment phase or to both in the de-ionization treatment of water. Considering for example the cation exchange phase alone, the economy lies in reducing to a minimum the requirement of regenerant acid for a maximum removal of cations from the water, the effectiveness lies in the obtainable maximum net removal of cations while the efficiency lies in the ratio of acid applied to exchanger capacity for cation removal, that is the ratio of per cent regenerant acid of the theoretical requirement to the exchanger capacity expressed in grains per cubic foot of the material.

In distinction from methods whereby the exhausting solution as well as the regenerant solution and the rinse water are passed co-directionally through the bed, this invention proposes passing only the exhausting solution or raw water downwardly through the ion exchange bed until the exchange capacity of the bed has become exhausted to a desired degree, while then passing regenerant solution and rinse water sequentially upwardly or counterflow through the bed, the operation being conducted in such a manner that the bed remains substantially submerged at all times. Briefly then, this invention proposes (a) downflow of raw water; (b) upflow of regenerant solution, and (c) upflow of rinse water.

In order to attain the foregoing objects, this invention proposes that at least the bottom portion of the ion exchange bed be kept free from those ions which the exchange material is to remove from the exhausting solution or raw water, and that it be kept free of such ions at least during that period of the operating cycle in which the residual regenerant solution is being displaced upwardly by the rinse water and the bed being washed free from trailing regenerant solution. Therefore, this invention proposes for displacing from the bed residual regenerant solution the use of a rinse water which has been specially treated so as to be free from the ions in question, and to pass such conditioned rinse water upwardly through the bed subsequent to the upward passage through the bed of the regenerant solution, provided that the bed has been exhausted by a downflow of raw water.

In this way, it is possible to have the treated water effluent end of the cation exchange bed significantly free from cations (as distinguished from H-ions) at the time that the water treating phase of the operating cycle starts.

It will be understood that the trailing end portion of the volume of regenerant solution thus being displaced from the voids of the bed contains largely unconverted regenerant chemical and leaves behind while thus being displaced, fully regenerated exchange material substantially free from or uncontaminated by undesirable ions, the undesirable ones being those which the exchange bed is to remove from the raw water. Indeed where a regenerant solution has been made up of de-ionized or ion-free water, the regenerated bottom portion of the exchanger bed is left theoretically free from or uncontaminated by undesirable ions. According to this invention the regenerated bottom end portion of the bed is kept in such uncontaminated condition during the rinsing period by the use of a rinse water that has been treated or conditioned so as to contain substantially none of the undesirable ions. Hence, this rinse water acting as a neutral displacing agent for the residual regenerant solution, leaves the bottom end portion of the bed free from and uncontaminated by the undesirable ions. This use of thus conditioned rinse water is in distinction from the customary practice of using the raw water itself for rinsing. That is to say in conventional downflow regeneration the use of treated rinse water instead of raw water would not benefit the operation. After the regenerant solution has been displaced with conditioned rinse water and the bed washed free of residual regenerant solution and products thereof, the bed is again ready for treating the exhausting solution or raw water to be passed in the reverse direction, namely, downwardly through the regenerated bed.

In one embodiment, in water de-ionization treatment the cation exchange bed after a downflow exhaustion by raw water to remove the cations therefrom in exchange for H-ions is treated upflow with regenerant acid solution, and then rinsed upflow with cation-free water. The cation-free water may be raw water which has already passed the cation exchange bed or it may be completely de-ionized or ion-free water or substantially the equivalent of distilled water such as is obtainable from the combination cation and anion exchange treatment of the raw water.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which—

Fig. 1 is a simple flow sheet illustrating the ion exchange operating cycle.

Fig. 2 is a diagram chart illustrating by way of comparative curves the ion removal effectiveness of the ion exchange bed (a) with the use of the customary raw water and (b) with the use of cation free water for rinsing.

Fig. 3 including sub-figures (a) to (f) diagrammatically represents as a special embodiment varying conditions in the operating cycle as applied to the ion exchange phase in the treatment of raw water and conducted in a special manner.

In the flow sheet in Fig. 1 the path of the rinsing liquid is indicated in full lines while the path of the exhausting solution or raw water is indicated in dotted lines. By way of example the function of this flow sheet will be described, explained and discussed as being applied to the cation exchange phase in the treatment of a raw water. The conditioned rinse water in this instance will herein be called cation-free water such as results from the passage of raw water through the cation-exchange bed, although in its stead there may be used fully treated or deionized water such as may have passed through the cation exchange as well as the anion exchange phase.

This flow sheet of Fig. 1 is purely diagrammatical, no consideration being given in this drawing to auxiliary equipment means such as pumps, or to the disposition of operating levels of the tanks and liquids, although in principle the arrangement should be such that the ion exchange bed is maintained substantially submerged at all times during the operation of the process.

A container 10 holds a bed of granular cation exchange material 11, and has flow passage connections with a tank 12 indicated to hold regenerant solution 13 such as $H_2SO_4$ to be supplied to the cation exchange bed 11 for the upflow regeneration thereof. Container 10 also has flow passage connection with a tank 14 representing a storage tank for treated or cation-free water 15 to serve as rinse water to effect the upflow displacement of residual regenerant solution from bed 11.

Raw water which is herein also called the exhausting solution enters the ion exchange tank by way of line 16 provided with a control valve 16ª, and after passing downwardly through the bed 11 flows from the tank and passes from the treatment system shown by way of the line or effluent header 17.

The effluent header 17 leading from the bottom of the exchange bed 11 has one branch connection 18 provided with a control valve 19, and leading to regenerant solution tank 12 to provide treated or cation-free make-up water for regenerant solution ($H_2SO_4$) in that tank, and another branch connection 20 provided with a control valve 21 and leading to a tank 14 to provide therein the conditioned or cation-free rinse water 15.

A supply header 22 leading to the bottom of the exchange bed 11 has one branch supply connection 23 provided with a control valve 24 for supplying regenerant solution from tank 12 to the bed 11 for the upflow regeneration thereof, and another branch connection 25 provided with a control valve 26 for supplying conditioned or cation-free rinse water for the upflow rinsing of the bed 11, while effecting upward displacement and washing out the excess regenerant acid and its exchange products from the bed. A discharge connection for the spent displaced acid and for the rinse water effluent is indicated at 27 above, although close to, the top level of the exchange bed 11, and is provided with a control valve 28.

The importance of this improved method of regenerating an ion exchange bed appears from an interpretation of the curves A and B in Fig. 2 since they represent the differential in operating results when using raw water or exhausting solution (curve A) and when using cation-free water (curve B) as the rinsing liquid. These curves present the content of unremoved cations in the respective treated liquids expressed in P. P. M. (parts per million) as $CaCO_3$ and plotted as a function of exchanger capacity expressed in terms of gallons of treated water effluent per cubic foot of exchange bed.

The tests represented by these curves were made using a bed of known synthetic resinous cation exchange material obtainable on the open market.

The exhausting solution was a water containing:

.00133 N NaCl + .00067 N $NaHCO_3$ i. e. .002 N total i. e. 100 P. P. M. $CaCO_3$ equivalent with an alkalinity of 33 P. P. M.

The flow rate of the exhausting solution was:

1.35 gals. p. m./cu. ft.

The regenerant solution contained 120% theoretical $H_2SO_4$.

The upflow rinse was at a rate of 11.6 gals./cu. ft. for both the rinse with cation-free water and with raw water (exhausting solution).

That is to say, a resinous cation exchange material was employed to remove sodium from a solution of NaCl and $NaHCO_3$, the exchanger being regenerated upflow by sulfuric acid.

Two parallel tests were made:

According to the A curve, the regenerant acid was applied to the bottom of the bed and passed upwardly therethrough, and the bed was then rinsed and regenerated upflow with a quantity of untreated exhausting solution.

According to the B curve cation-free de-ionized water was used to rinse the acid out of the bed upwardly.

In both cases the volume of rinse solution was the same and equal to 2.0 bed void volume. The curves of Fig. 2 show especially the results of the initial exhaustion in the two cases, the metallic cations ($Na^+$ in this case) remaining in the effluent being plotted against the cumulative effluent. According to the B curve the rinsing with D–I water which had less than 1.5 P. P. M. total cations, produced an effluent which had about 2 P. P. M. remaining cations; while when rinsed with untreated, that is 100 P. P. M. water, the effluent according to the A curve had 3.5 to 4.0 P. P. M. cations or nearly double those resulting from the rinse with de-ionized water as represented by the B curve.

Furthermore, approximately 25 gallons of the initial effluent, per cubic foot of bed, following the untreated water rinse was found to be notably higher in cations. In fact this effluent portion represents a loss since in many cases of practice with strict removal requirements it must be sent to waste.

Interpreting the shapes of the curves A and B, it appears that the absolute maximum removal of cations obtainable with the use of cation-free rinse water (B curve) is unobtainable when the exhausting solution or raw water is used for rinsing. From the shapes of these curves it appears that the initial portion thereof as represented by the peak $P^1$, that is about the first 25 gallons of treated water in the A curve has an undesirably high content of cations. A corresponding portion of the B curve shows only a negligible increase in unremoved cations for a corresponding initial portion of the curve, such as represented by the peak $P^2$. The remaining and major portions of the curves are of substantially shallow concave configuration indicating that a maximum cation removal for the B curve lies at point c on the curve and at about 500 gallons per cubic foot capacity on the abscissa, and for the A curve at point d and at about 600 gallons per cubic foot.

A comparison of the curves also shows that a cation removal according to point $d$ on the curve A is attainable with a capacity of only 600 gallons per cubic foot, whereas the equivalent cation removal according to point $e$ on the curve B affords a capacity of about 1,350 gallons per cubic foot. The rising end portions of the curves A and B indicate the approach towards more or less complete exhaustion of the exchange bed or towards what is known as the "breakthrough."

In one embodiment of this invention, an exceptionally high economy can be obtained along with a high removal efficiency. Accordingly, it is proposed to exhaust the cation exchanger bed incompletely by the downward flow of the raw water by discontinuing the exhaustion prior to the occurrence of any appreciable rise of the effluent pH and prior to "break-through." At the same time it is proposed to regenerate the bed incompletely by the upflow of the regenerant liquid so that a high degree of utilization thereof is attained. In other words, a bottom zone as well as a top zone of the exchanger bed is left unutilized with respect to the function of ion removal itself. These two zones may be said to constitute safety zones against any substantial downward breakthrough of the exhausting solution, as well as against any substantial upward break-through of the regenerant solution. In this way, and by using cation-free (or de-ionized) rinse water in upflow fashion, there is provided a top zone or stratum that remains substantially saturated with cations while the bottom zone remains substantially cation-free, during the exchange operating cycle.

In this way, with a relatively small sacrifice in exchanger capacity along with the use of cation-free rinse water there can be attained high operating economy combined with a high ion removal rate.

The full exchange operating cycle according to this preferred embodiment is diagrammatically illustrated in Fig. 3 in which the sub-figures $(a)$ to $(f)$ represent consecutive conditions or phases of the cation exchanger bed during the operating cycle.

The condition indicated in $(a)$ of Fig. 3 shows the bed with the major lower portion $P_1$ regenerated, that is saturated with H-ions, while a relatively small top zone $P_2$ remains exhausted, that is saturated with cations exemplified by Ca- and Na-ions. For the present purpose this is considered the regenerated condition of the bed when it is ready to have the downflow of raw water W started therethrough.

According to the condition indicated in $(c)$ of Fig. 3, as the flow of raw water has been continued, the bed has become exhausted throughout the upper portion or zone $P_5$, so that there remains only a relatively small bottom zone $P_6$ unexhausted.

According to the conditions indicated in $(b)$ and $(c)$ of Fig. 3, the effluent E consists of substantially cation-free water. The condition $(c)$ represents that point of exhaustion of the bed at which the flow of raw water therethrough is stopped so as to prevent break-through, whereupon the bed may be regenerated.

According to the condition indicated in $(d)$ of Fig. 3, a regenerant solution R such as $H_2SO_4$ is being passed upflow or counterflow through the bed. This condition therefore shows the bed partially regenerated, namely with a lower portion $P_7$ regenerated and cation-free while an upper portion $P_8$ is still cation-saturated, the discharge of spent regenerant solution S being indicated from the top of the bed.

According to the condition indicated at $(e)$ in Fig. 3, cation-free or de-ionized rinse water D is being shown to flow upwardly through the bed thereby displacing a volume of residual regenerant solution upwardly through the bed and causing it to be spent as the upward regeneration of the bed proceeds further covering a regenerated portion $P_9$ as compared with an unregenerated portion $P_{10}$, spent solution being discharged from the top of the bed.

Then, according to condition $(f)$ in Fig. 3, after a required predetermined amount of regenerant acid has thus been applied, and spent solution thus has been displaced and washed out upwardly from the bed, spent rinse water I will eventually flow from the top of the bed, a small top zone $P_{11}$ of the bed being left cation-saturated while by far the major portion $P_{10}$ of the bed appears regenerated with H-ions. This condition resembles the condition $(a)$ indicating that the bed is now again ready for raw water to be treated by downflow therethrough. Residual rinse water initially flowing back downwardly from the bottom of the bed will appear cation-free and may go to production by way of the anion exchange treatment phase or otherwise along with subsequent treated water effluent.

It will be noted from a survey of the bed conditions indicated in $(a)$ to $(f)$ in Fig. 3, that a bottom zone of the bed is maintained cation-free at all times during the exchange operating cycle according to this embodiment.

I claim:

1. The method of treating water to remove therefrom ionized salts by passage of said water first through a cation exchange bed of granular H-ion exchange material and then through an anion exchange bed of granular acid-adsorbing anion exchange material, and in which the operating cycle of the cation exchange material comprises progressively exhausting the bed by the flow of said water therethrough during an exhaustion phase, regenerating the exhausted cation exchange bed with a mineral acid solution to restore the H-ion exchange capacity thereof during a regeneration phase, and displacing residual regenerant solution from said cation exchange bed with rinse water during a rinsing phase prior to the re-use of the bed in a subsequent operating cycle, whereby said cation exchange bed is maintained substantially in submergence throughout the operating cycle; characterized by conducting the operating cycle in a manner whereby there is attained a significantly cation-free condition of the treated-water effluent end portion of the bed for the start of the exhaustion phase which comprises passing the water to be treated through said cation exchange bed in one direction to exhaust the bed progressively in the direction of the flow of said water towards the treated-water effluent-end of the bed until that bed is substantially exhausted, passing through the bed in the opposite direction regenerant solution whereby the bed is progressively regenerated in the direction of flow of the regenerant solution while the treated-water effluent end portion of the bed is rendered significantly cation-free although loaded with H-ions, and passing through the bed co-directional with the flow of said regenerant solution rinse water that has been treated to be significantly cation-free whereby regenerant solution is displaced from the bed while leaving the treated water effluent end thereof significantly cation-free although loaded with H-ions.

2. The method according to claim 1, in which the flow of water to be treated is downward through the bed.

3. The method according to claim 1, in which the rinse water comprises water which has been rendered substantially cation-free by treatment with H-ion exchange material.

4. The method according to claim 1, in which the rinse water comprises a quantity of said treated water.

5. The method according to claim 1, in which the operating cycle is conducted in a manner to maintain said effluent portion of the cation exchange bed substantially cation-free throughout the operating cycle.

ELLIOTT J. ROBERTS.

REFERENCES CITED

The following references are of record in the file of this patent:

UNITED STATES PATENTS

| Number | Name | Date |
| --- | --- | --- |
| 1,695,542 | Eisenhauer | Dec. 18, 1928 |
| 1,885,454 | Lauterbur | Nov. 1, 1932 |
| 2,088,104 | Zimmerman | July 27, 1937 |
| 2,132,312 | Moore | Oct. 4, 1938 |
| 2,226,743 | Riley | Dec. 31, 1940 |
| 2,227,520 | Tiger | Jan. 7, 1941 |
| 2,248,055 | Bird | July 8, 1941 |
| 2,264,402 | Pattock | Dec. 2, 1941 |
| 2,267,841 | Riley | Dec. 30, 1941 |
| 2,304,661 | Shoemaker | Dec. 8, 1942 |
| 2,351,648 | Whitlock | June 20, 1944 |
| 2,368,574 | Shoemaker | Jan. 30, 1945 |
| 2,429,943 | Prager | Oct. 28, 1947 |